United States Patent
Tracey et al.

(10) Patent No.: US 7,770,621 B2
(45) Date of Patent: Aug. 10, 2010

(54) AIR BARRIER COMPOSITION FOR INNERLINERS

(75) Inventors: Donald S. Tracey, Kingwood, TX (US); Dirk F. Rouckhout, Linter (BE); Walter H. Waddell, Pasadena, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 204 days.

(21) Appl. No.: 11/842,523

(22) Filed: Aug. 21, 2007

(65) Prior Publication Data

US 2009/0050251 A1    Feb. 26, 2009

(51) Int. Cl.
*B60C 5/12* (2006.01)
*C08K 5/04* (2006.01)

(52) U.S. Cl. ...................... 152/510; 524/394

(58) Field of Classification Search .................. 152/510
See application file for complete search history.

(56) References Cited

U.S. PATENT DOCUMENTS 2,791,258 A * 5/1957 Peterson et al. ............. 152/510
2006/0167184 A1* 7/2006 Waddell et al. ............. 525/192

FOREIGN PATENT DOCUMENTS

| DE | 10 2004 005 132 | | 8/2005 |
| JP | 2005206673 A | * | 8/2005 |
| WO | WO/2005017013 | | 2/2005 |

OTHER PUBLICATIONS

Translation of JP 2005206673, Aug. 2005.*
U.S. Appl. No. 11/823,711, filed Jun. 28, 2007, Rouckhout et al.

* cited by examiner

*Primary Examiner*—Ling-Siu Choi
*Assistant Examiner*—Hui Chin
(74) *Attorney, Agent, or Firm*—Nancy T. Krawczyk; Andrew B. Griffis (57) ABSTRACT

According to the invention, a processing aid is used to improve processing in a green (uncured) rubber composition, such as in downstream in-plant processing of an innerliner compound, and maintaining, or more preferably, reducing the air permeability of the cured composition, e.g., innerliner compound. In embodiments, another of the advantages of the present invention is that the processing aid according to the invention can be used in very low levels relative to the other processing aids and oils.

8 Claims, 1 Drawing Sheet

Fig. 1
Air Permeability (MOCON) from Table 4

AIR BARRIER COMPOSITION FOR INNERLINERS

FIELD OF THE INVENTION

The invention relates to processing aids in halobutyl rubber formulations for innerliners.

BACKGROUND OF THE INVENTION

The tire industry continually seeks improvements to current practices. In particular, processing properties of the green (uncured) composition in the tire plant versus in-service performance of the cured tire composite is an area of active research. A continuing in-service problem in the tire industry is the ability to improve the endurance of tires for applications used in a wide variety of conditions such as is required for agricultural tires, aircraft tires, earthmover tires, heavy-duty truck tires, mining tires, motorcycle tires, medium truck tires, and passenger car tires. The performance of the tire innerliner under a variety of temperature conditions is important since any cracking can compromise the desirably low air permeability required.

More particularly, the problem of improving air impermeability properties, the flex fatigue properties, or the adhesion to adjoining tire components of elastomeric compositions without affecting the processability of the uncured elastomeric compositions and/or while maintaining or improving the physical property performance of the cured elastomeric compositions useful for tire articles still remains.

The selection of ingredients and additives for the final commercial formulation depends upon the balance of properties desired, namely, processability and tack of the green (uncured) composition in the tire plant versus the in-service performance of the cured tire composite. Examples of elastomers used are butyl (isobutylene-isoprene rubber or IIR), bromobutyl (brominated isobutylene-isoprene rubber or BIIR), chlorobutyl (chlorinated isobutylene-isoprene rubber or CIIR), star-branched brominated butyl (SBB), Exxpro™ elastomers (brominated isobutylene-co-p-methyl-styrene copolymer or BIMSM), etc.

Also important are processing oils. Conventional processing oils are the naphthenic, paraffinic, and aromatic oils. Alternatives to traditional processing oils are continually sought in order to improve air barrier performance with no adverse affects on cure or other performance properties, such as discussed in WO 2005017013. For instance, some of the present inventors have recently discovered improvements in certain properties by the use of MES (mild extraction solvate), produced by solvent extraction of heavy oil distillates or by treating heavy oil distillates with hydrogen in the presence of catalysts (hydrogenation), and/or TDAE (treated distillate aromatic extract) as processing oils. See U.S. application Ser. No. 11/823,711 (filed Jun. 28, 2007).

Another conventional ingredient in rubber compositions is at least one processing aid, for example, resin, plastomer, polybutene, polyalphaolefin oils, or mixtures thereof When conventional processing aids are used as simple drop-in replacements for current ingredients such as processing aids, there may be seen an improvement in compound processability, such as in Mooney viscosity. See, for instance, DE 10 2004 005 132. However, typically air permeability is adversely affected, i.e., air permeability is increased. This is undesirable when the formulation is used for innerliners.

The present inventors have surprisingly discovered a processing aid which, when used in low levels in addition to current materials, provides surprising reduction in air permeability.

SUMMARY OF THE INVENTION

The invention is directed to processing aids for rubber formulations, particularly halobutyl rubber formulations which are added to the innerliner compound formulation during mixing in order to impart improved processability and/or air impermeability without adversely affecting other important properties. These processing aids, which are fatty acid metal salts such as zinc soaps, are used in the amount of 1-5 parts per hundred (phr) elastomer.

It is an object of the present invention to improve at least one of (i) processability of uncured elastomer composition, preferably halobutyl rubber compositions, and (ii) reduce air permeability in a cured elastomer composition, preferably halobutyl rubber composition, suitable for a tire innerliner. In the preferred embodiment, both (i) and (ii) are achieved.

These and other objects, features, and advantages will become apparent as reference is made to the following detailed description, preferred embodiments, examples, and appended claims.

DETAILED DESCRIPTION

According to the invention, a processing aid is used to improve processing in a green (uncured) rubber composition, such as in downstream in-plant processing of an innerliner compound, and maintaining, or more preferably, reducing the air permeability of the cured innerliner composition.

The processing aid that is added in addition to conventional processing aids comprises a fatty acid salt, such as a zinc soap. In a preferred embodiment the processing aid is Struktol™ HT 254, a zinc soap commercially available from Struktol.

In embodiments, another of the advantages of the present invention is that the processing aid according to the invention can be used in very low levels relative to the other processing aids and oils. The fatty acid salt-containing additive is preferably used in the amount of 1 to 5 phr, more preferably 1.5 to 4.5 phr, still more preferably 2 to 4 phr, with ranges from 1 to 2 phr, 2-3 phr, 3-4 phr, and 3.5-4.5 phr also being contemplated. The measurement is relative to the total amount of elastomer added.

The elastomer compositions according to the present invention are preferably at least one halobutyl rubber. Halobutyl rubbers are isobutylene-based elastomers and include bromobutyl rubber, chlorobutyl rubber and branched ("star-branched") halogenated butyl rubbers. Halobutyl rubbers are per se known in formulations for many different tire applications, including innertubes or innerliners for tires, and are the polymers of choice for air-retention in tire innerliners for passenger, truck/bus, and aircraft applications. See, for example, EP 0 127 998.

In a preferred embodiment, the halobutyl rubber of the invention is selected from the group consisting of bromobutyl rubber, chlorobutyl rubber and branched ("star-branched") halogenated butyl rubbers, and halogenated random copolymers of isobutylene and para-methylstyrene, such as Exxpro™ elastomers (ExxonMobil Chemical Company, Houston, Tex.). The latter type of halobutyl rubber are a halogenated random copolymer of isobutylene and para-methylstyrene, and have been of particular interest due to their improvements over butyl rubbers. A blend of Exxpro™ elastomers with secondary elastomers or other polymers affords a compound having a desirable balance of properties achieved through suitable processing windows. See, e.g., U.S. Pat. No. 5,386,864.

A commercial embodiment of a suitable halogenated butyl rubber of the present invention is Bromobutyl 2222 (ExxonMobil Chemical Company, Houston, Tex.). Its Mooney viscosity is from 27 to 37 (ML 1+8 at 125° C., ASTM D1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084).

A commercial embodiment of a suitable halogenated butyl rubber of the present invention is Chlorobutyl 1066 (ExxonMobil Chemical Company, Houston, Tex.). Its Mooney viscosity is from 33 to 43 (ML 1+8 at 125° C., ASTM D1646, modified), and the chlorine content is from 1.18 to 1.34 wt % relative to the Chlorobutyl 1066. Further, cure characteristics of Chlorobutyl 1066 are as follows: MH is from 34 to 48 dN·m, ML is from 9.5 to 18.5 dN·m (ASTM D2084).

A commercial embodiment of the halogenated star branched butyl rubber of the present invention is Bromobutyl 6222 (ExxonMobil Chemical Company, Houston, Tex.), having a Mooney viscosity (ML 1+8 at 125° C., ASTM D1646, modified) of from 27 to 37, and a bromine content of from 2.2 to 2.6 wt % relative to the halogenated star branched butyl rubber. Further, cure characteristics of Bromobutyl 6222 are as follows: MH is from 24 to 38 dN·m, ML is from 6 to 16 dN·m (ASTM D2084).

A commercial embodiment of the halogenated isobutylene-p-methylstyrene rubber of the present invention is Exxpro™ elastomers (ExxonMobil Chemical Company, Houston, Tex.), having a Mooney viscosity (ML 1+8 at 125° C., ASTM D1646, modified) of from 30 to 50, a p-methylstyrene content of from 4 to 8.5 wt %, and a bromine content of from 0.7 to 2.2 wt % relative to the halogenated isobutylene-p-methylstyrene rubber.

The composition according to the invention should also contain conventional processing aids, as set forth previously, in conventional amounts.

Thus, for example, the compositions according to the present invention should contain at least one ingredient selected from resins, plastomers, polybutenes, polyalphaolefin oils in the amount of 5-20 phr, preferably 10-15 phr, based on the total amount of elastomer.

As previously mentioned, the green (uncured) compositions of the invention include other conventional additives such as fillers. Typically the filler will be selected from carbon black and/or clays.

Thus, the compositions of this invention optionally include carbon black. The preferred carbon black will have a surface area of less than 40 m$^2$/g and a dibutylphthalate oil absorption of less than 80 cm$^3$/100 gm. Preferred carbon blacks include, but are not limited to N660, N762, N774, N907, N990, Regal 85, and Regal 90.

It will be recognized by one of skill in the art in possession of the present disclosure that the certain alternative materials may be used, such as discussed below.

In preferred embodiments, the composition also comprises clay. In a preferred embodiment, the clay comprises at least one silicate.

In certain embodiments, the silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are smectite-clays prepared synthetically, e.g., by hydrothermal processes as disclosed in U.S. Pat. Nos. 3,252,757, 3,586,468, 3,666,407, 3,671,190, 3,844,978, 3,844,979, 3,852,405, and 3,855,147.

In yet other embodiments, the at least one silicate may comprise natural or synthetic phyllosilicates, such as montmorillonite, nontronite, beidellite, bentonite, volkonskoite, laponite, hectorite, saponite, sauconite, magadite, kenyaite, stevensite and the like, as well as vermiculite, halloysite, aluminate oxides, hydrotalcite, and the like. Combinations of any of the previous embodiments are also contemplated.

The layered clays described above may be modified such as intercalated or exfoliated by treatment with at least one modifying agent or swelling agent or exfoliating agent or additive capable of undergoing ion exchange reactions with the cations present at the interlayer surfaces of the layered filler.

Modifying agents are also known as swelling or exfoliating agents. Generally, they are additives capable of undergoing ion exchange reactions with the cations present at the interlayer surfaces of the layered filler. Suitable exfoliating additives include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

For example, amine compounds (or the corresponding ammonium ion) are those with the structure $R^2R^3R^4N$, wherein $R^2$, $R^3$, and $R^4$ are $C_1$ to $C_{30}$ alkyls or alkenes in one embodiment, $C_1$ to $C_{20}$ alkyls or alkenes in another embodiment, which may be the same or different. In one embodiment, the exfoliating agent is a so-called long chain tertiary amine, wherein at least $R^2$ is a $C_{14}$ to $C_{20}$ alkyl or alkene.

In other embodiments, a class of exfoliating additives include those which can be covalently bonded to the interlayer surfaces. These include polysilanes of the structure —$Si(R^5)_2R^6$ where $R^5$ is the same or different at each occurrence and is selected from alkyl, alkoxy or oxysilane and $R^6$ is an organic radical compatible with the matrix polymer of the composite.

Other suitable exfoliating additives include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 as well as WO92/02582.

In an embodiment, the exfoliating additive or additives are capable of reacting with the halogen sites of the halogenated elastomer to form complexes which help exfoliate the clay. In certain embodiments, the additives include all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, so called dihydrogenated tallowalkyl-methylamine and the like, and amine-terminated polytetrahydrofuran; long-chain thiol and thiosulfate compounds like hexamethylene sodium thiosulfate.

In yet other embodiments, modifying agents include at least one polymer chain comprising a carbon chain length of from $C_{25}$ to $C_{500}$, wherein the polymer chain also comprises an ammonium-functionalized group described by the following group pendant to the polymer chain E:

wherein each R, $R^1$ and $R^2$ are the same or different and independently selected from hydrogen, $C_1$ to $C_{26}$ alkyl, alkenes or aryls, substituted $C_1$ to $C_{26}$ alkyls, alkenes or aryls, $C_1$ to $C_{26}$ aliphatic alcohols or ethers, $C_1$ to $C_{26}$ carboxylic acids, nitriles, ethoxylated amines, acrylates and esters; and wherein X is a counterion of ammonium such as $Br^-$, $Cl^-$ or $PF_6^-$.

The modifying agent such as described herein is present in the composition in an amount to achieve optimal air retention as measured by the permeability testing described herein. For example, but not limited to, the additive may be employed from 0.1 to 40 phr in one embodiment, and from 0.2 to 20 phr in another embodiment, and from 0.3 to 10 phr in yet another embodiment.

The exfoliating additive may be added to the composition at any stage; for example, the additive may be added to the elastomer, followed by addition of the layered filler, or may be added to a combination of at least one elastomer and at least one layered filler; or the additive may be first blended with the layered filler, followed by addition of the elastomer in yet another embodiment.

Examples of some commercial products are Cloisites produced by Southern Clay Products, Inc. (Gonzales, Tex.). For example, Cloisite Na⁺, Cloisite 30B, Cloisite 10A, Cloisite 25A, Cloisite 93A, Cloisite 20A, Cloisite 15A, and Cloisite 6A. They are also available as SOMASIF and LUCENTITE clays produced by CO-OP Chemical Co., LTD. (Tokyo, Japan). For example, SOMASIF™ MAE, SOMASIF™ MEE, SOMASIF™ MPE, SOMASIF™ MTE, SOMASIF™ ME-100, LUCENTITE™ SPN, and LUCENTITE(SWN).

The amount of clay or exfoliated clay incorporated in the nanocomposites in accordance with an embodiment of the invention is sufficient to develop an improvement in the mechanical properties or barrier properties of the nanocomposite, for example, tensile strength or oxygen permeability. Amounts generally will range from 0.5 to 10 wt % in one embodiment, and from 1 to 5 wt % in another embodiment, based on the polymer content of the nanocomposite. Expressed in parts per hundred rubber, the clay or exfoliated clay may be present from 1 to 30 phr in one embodiment, and from 5 to 20 phr in another embodiment.

Other ingredients include tackifiers and a curative.

Examples of tackifiers useful in the present invention include those described in WO 2004044051.

Curing agents include those components described above that facilitate or influence the cure of elastomers, such as metals, accelerators, sulfur, peroxides, and other agents common in the art. In a preferred embodiment the curing agents will be selected from those set forth in WO2007-067187.

In certain embodiments, the elastomeric compositions and the articles made from those compositions may comprise or be manufactured with the aid of at least one cure package, at least one curative, at least one crosslinking agent, and/or undergo a process to cure the elastomeric composition. As used herein, at least one curative package refers to any material or method capable of imparting cured properties to a rubber as commonly understood in the industry.

One or more crosslinking agents are preferably used in the elastomeric compositions of the present invention, especially when silica is the primary filler, or is present in combination with another filler. Crosslinking and curing agents include sulfur, zinc oxide, and fatty acids. More preferably, the coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl triethoxysilane (sold commercially as A1100 by Witco), gamma-mercaptopropyltrimethoxysilane (A189 by Witco) and the like, and mixtures thereof. In one embodiment, bis-(3-triethoxysilypropyl)tetrasulfide (sold commercially as "Si69") is employed.

Peroxide cure systems or resin cure systems may also be used.

Heat or radiation-induced crosslinking of polymers may also be used.

Generally, polymer blends, for example, those used to produce tires, are crosslinked thereby improve the polymer's mechanical properties. It is known that the physical properties, performance characteristics, and durability of vulcanized rubber compounds are directly related to the number (crosslink density) and type of crosslinks formed during the vulcanization reaction. (See, e.g., Helt et al., *The Post Vulcanization Stabilization for NR* in RUBBER WORLD, p 18-23 (1991)).

Sulfur is the most common chemical vulcanizing agent for diene-containing elastomers. It exists as a rhombic 8-member ring or in amorphous polymeric forms. The sulfur vulcanization system also consists of the accelerator to activate the sulfur, an activator, and a retarder to help control the rate of vulcanization. Accelerators serve to control the onset of and rate of vulcanization, and the number and type of sulfur crosslinks that are formed. These factors play a significant role in determining the performance properties of the vulcanizate.

Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Retarders may be used to delay the initial onset of cure in order to allow sufficient time to process the unvulcanized rubber.

Halogen-containing elastomers such as halogenated star-branched butyl rubber, brominated butyl rubber, chlorinated butyl rubber, star-branched brominated butyl (polyisobutylene/isoprene copolymer) rubber, halogenated poly(isobutylene-co-p-methylstyrene), polychloroprene, and chlorosulfonated polyethylene may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction.

Generally, polymer blends may be crosslinked by adding curative molecules, for example sulfur, metal oxides, organometallic compounds, radical initiators, etc., followed by heating. In particular, the following metal oxides are common curatives that will function in the present invention: ZnO, CaO, MgO, $Al_2O_3$, $CrO_3$, FeO, $Fe_2O_3$, and NiO. These metal oxides can be used alone or in conjunction with the corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof (e.g., DIAK products sold by DuPont). (See also, *Formulation Design and Curing Characteristics of NBR Mixes for Seals*, RUBBER WORLD, p 25-30 (1993)). This method of curing elastomers may be accelerated and is often used for the vulcanization of elastomer blends.

The acceleration of the cure process is accomplished in the present invention by adding to the composition an amount of an accelerant, often an organic compound. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), benzothiazyl disulfide (MBTS), hexamethylene-1,6-bisthiosulfate disodium salt dihydrate (sold commercially as DURALINK™ HTS by Flexsys (Akron, Ohio)), 2-morpholinothio benzothiazole (MBS or MOR), blends of 90% MOR and 10% MBTS (MOR 90), N-tertiarybutyl-2-benzothiazole sulfenamide (TBBS), and N-oxydiethylene thiocarbamyl-N-oxydiethylene sulfonamide (OTOS), zinc 2-ethyl hexanoate (ZEH), and "thioureas".

In one embodiment of the invention, the at least one curing agent(s) is present from 0.2 to 15 phr, and from 0.5 to 10 phr in another embodiment, and from 2 phr to 8 phr in yet another embodiment.

The compositions may be vulcanized (cured) by any suitable means such as by subjecting them using heat or radiation according to any conventional vulcanization process. The amount of heat or radiation ("heat") is that required to affect a cure in the composition, and the invention is not herein limited to the method and amount of heat required to cure the composition in forming a stock material or article. Typically, the vulcanization is conducted at a temperature ranging from about 100° C. to about 250° C. in one embodiment, from 150° C. to 200° C. in another embodiment, for about 1 to 150 minutes.

Other optional and preferred ingredients will become apparent as reference is made to the following experiments.

Experimental

The following examples are meant to illustrate the present invention and provide a comparison with other methods. Numerous modifications and variations are possible and it is to be understood that within the scope of the appended claims, the invention may be practiced otherwise than as specifically described herein.

Carbon black N660 can be obtained from, e.g., Cabot Corp. (Billerica, Mass.). Stearic acid, a curing agent, can be obtained from, e.g., C. K. Witco Corp. (Taft, La.), Kadox 911, a zinc oxide activator, can be obtained from C. P. Hall (Chicago, Ill.). MBTS can be obtained from R. T. Vanderbilt (Norwalk, Conn.) or Elastochem (Chardon, Ohio). SP-1068 Resin is a brominated phenol-formaldehyde resin from Schenectady International. CALSOL 810 is a naphthenic processing oil from R. E. Carroll (Trenton, N.J.). Polyfil® DL Clay is a delaminated clay available from J.M. Huber Corporation (Havre de Grace, Md.). Whiting (CaCO3) and zinc oxide are available from numerous sources. These ingredients are per se well known. See, for instance, U.S. Pat. No. 7,241,831.

Suitable elastomeric compositions for such articles as tire innerliners may be prepared by using conventional mixing techniques including, e.g., kneading, roller milling, extruder mixing, internal mixing (such as with a Banbury® mixer) etc. The sequence of mixing and temperatures employed are well known to the skilled rubber compounder, the objective being the dispersion of fillers, activators and curatives in the polymer matrix without excessive heat buildup. A useful mixing procedure utilizes a Banbury® mixer in which the polymer rubber, carbon black and plasticizer are added and the composition mixed for the desired time or to a particular temperature to achieve adequate dispersion of the ingredients. Alternatively, the rubber and a portion of the carbon black (e.g., one-third to two-thirds) is mixed for a short time (e.g., about 1 to 3 minutes) followed by the addition of the remainder of the carbon black and oil. Mixing is continued for about 1 to 10 minutes at high rotor speed during which time the mixed components reach a temperature of about 140° C. Following cooling, the components are mixed in a second step on a rubber mill or in a Banbury® mixer during which the curing agent and optional accelerators, are thoroughly and uniformly dispersed at relatively low temperature, e.g., about 80° C. to about 105° C., to avoid premature curing of the composition. Variations in mixing will be readily apparent to those skilled in the art and the present invention is not limited to any specific mixing procedure. The mixing is performed to disperse all components of the composition thoroughly and uniformly.

An innerliner stock is then prepared by calendering or extruding the compounded rubber composition into a sheet having a thickness of roughly 40 to 100 mil gauge and cutting the sheet material into strips of appropriate width and length for innerliner applications in the tire building operation. The liner can then be cured while in contact with the tire carcass and/or sidewall in which it is placed.

Test Methods

To start the mixing, the halobutyl rubber, i.e., Bromobutyl 2222, Exxpro™ MDX 03-1, or NanExx 28, was loaded into the pre-heated mixer running at a rotor speed of 60 rpm. Carbon black was then added after about 0.5 to 1 minute and the mixture was continued to be mixed for an additional 1-3 minutes. The resulting blend was discharged from the mixer and allowed to cool.

The mixer was then cooled down to 40° C. At a rotor speed of 40 rpm, the blend was put back into the mixer and mixing continued for 30 seconds. Stearic acid, ZnO, and MBTS accelerator were added and mixing continued for another 1-3 minutes. The resulting blend containing carbon black and curatives was discharged from the mixer and allowed to cool.

The Mooney viscosity, ML 1+4 (100° C.), of the blend containing N660 and curatives was measured according to ASTM D1646. For example, results of a typical test are reported as follows:

50-ML 1+4 (100° C.)

where 50-M is the Mooney viscosity number, L indicates the large rotor, 1 is the preheat time for the specimen in minutes, 4 is the time in minutes after starting the motor at which the reading is taken, and 100° C. is the test temperature. The error ($2\sigma$) in this measurement is ±0.65 Mooney viscosity units. The "MS" value is the Mooney scorch value.

Cure properties were measured using a MDR 2000 rheometer from Alpha Technologies, Inc. was used for determination of compound cure kinetics at the indicated temperature and 0.5 degree arc based on ASTM D2084. Test specimens were cured at the indicated temperature, typically from 150° C. to 180° C., for a time (in minutes) corresponding to Tc90+ appropriate mold lag. The values "MH" and "ML" used here and throughout the description refer to "maximum torque" and "minimum torque", respectively. The values of "T" are cure times in minutes, and "Ts" is scorch time" in minutes.

When possible, standard ASTM tests were used to determine the cured compound physical properties, see Table 1. Stress/strain properties (tensile strength, elongation at break, modulus values, energy to break) were measured at room temperature using an Instron 4202 or Instron 4204. Shore A hardness was measured at room temperature by using a Zwick Duromatic. The error (2σ) in measuring 100% Modulus is ±0.11 MPa units; the error (2σ) in measuring elongation is ±13% units.

Adhesion was tested using a one-inch strip adhesion, wherein one inch×three inch adhesive bonds to Kraft paper are prepared. Samples are hung horizontally (in peel mode) in an air circulating oven and a 100 gram weight is suspended from the free end of the bond. The oven temperature is raised 10° F. (4.1° C.) every 15 minutes. The peel-fail temperature is the average of three readings.

The error in the fatigue-to-failure values is ±20%.

Permeability testing proceeded according to the following description. All compounds were compression-molded with slow cooling to provide defect free pads. A compression and curing press was used. Test samples were vulcanized at 160° C. and cure times were set by using the MDR T90 time. Typical thickness of a compression-molded pad, prepared with a Carver press, is around 0.38 mm. Disks with 2" diameter were then punched out from molded pads for permeability testing. These disks were conditioned in a vacuum oven at 60° C. overnight prior to the measurement. The oxygen permeation measurements were performed using a Mocon OX-TRAN 2/61 permeability tester at 60° C. under the principle of *R. A. Pasternak et al.* in Vol. 8 JOURNAL OF POLYMER SCIENCE: PART A-2 467 (1970). There are six cells per instrument where gas transmission through each test sample in a cell is measured individually. Disks thus prepared were mounted on a template and sealed with vacuum grease. A steady flow of oxygen at 10 mL/min was maintained on one side of the disk, while a steady flow of nitrogen at 10 mL/min was maintained on the other side of the disk. Using the oxygen sensor on the nitrogen side, increase in oxygen concentration on the nitrogen side with time could be monitored. The time required for oxygen to permeate through the disk, or for oxygen concentration on the nitrogen side to reach a constant value, was recorded and used to determine the oxygen gas permeability. Data is reported either as an oxygen permeation rate (OPR) in cc*mm/(m$^2$-day) or a permeability coefficient in cc*mm/(m$^2$-day-mmHg) obtained by dividing OPR with the atmospheric pressure. To elaborate, OPR is the transmission rate normalized for sample thickness and is expressed as volume (cc) of gas per unit area of sample (m$^2$) in a discreet unit of time (24 hours).

TABLE 1

| Parameter | Units | Test |
|---|---|---|
| Mooney Viscosity (polymer) | ML 1 + 8, 125° C., MU | ASTM D1646 (modified) |
| Mooney Viscosity (composition) | ML 1 + 4, 100° C., MU | ASTM D1646 |
| Air permeability | cc-mm/m$^2$-day-mmHg | See text |
| Mooney Scorch Time | D5, D10, 135° C., minutes | ASTM D1646 |
| Moving Die Rheometer (MDR) @ 160° C., ±0.5°arc | | |
| ML | deciNewton · meter | |
| MH | dN · m | |
| T$_s$2 | minute | |
| T90 | minute | |
| Cure rate | dN · m/minute | ASTM D2084 |
| Physical Properties press cured Tc 90 + 2 min @ 160° C. | | |
| Hardness | Shore A | ASTM D2240 |
| Modulus 100% | MPa | ASTM D412 die C |
| Tensile Strength | MPa | |
| Elongation at Break | % | |
| Energy to Break | N/mm | |

When the processing aid is used as a simple drop-in replacement for current ingredients in a bromobutyl rubber innerliner formulation, there is a benefit to compound processability (Mooney viscosity), but air permeability is adversely increased, see Table 2.

As can be seen in the Table 2, Example #1 is the Control Compound; Example #2 is a direct replacement for the 40 MS Resin; Example #3 is a direct replacement for the 40 MS Resin and the Naphthenic process oil; and Example #4 is a direct replacement for all of the 40 MS Resin and a portion of the Naphthenic process oil. All Examples improve processability (Mooney viscosity), but the air permeability is increased which is not desirable.

Examples #5-#7 include a silicate filler in addition to the carbon black, and Example #5 is the Control Compound for this group. Example #6 is a direct replacement for the 40 MS Resin; Example #7 is a direct replacement for the 40 MS Resin and the Naphthenic process oil. Both Examples improve processability (Mooney viscosity), but the air permeability is increased which is not desirable.

Similar results are obtained when calcium carbonate is used as a filler in addition to carbon black, Examples #8-#10.

TABLE 2

| | 1 | 2 | 3 | 4 | 5 | 6 | 7 | 8 | 9 | 10 |
|---|---|---|---|---|---|---|---|---|---|---|
| Ingredients | | | | | | | | | | |
| BROMOBUTYL 2222 | 100 | 100 | 100 | 100 | 100 | 100 | 100 | 100 | 100 | 100 |
| N660 Carbon Black | 60 | 60 | 60 | 60 | 60 | 60 | 60 | 60 | 60 | 60 |
| STRUKTOL 40 MS Resin | 7 | | | | 7 | | | 7 | | |
| SP-1068 Resin | 4 | 4 | 4 | 4 | 4 | 4 | 4 | 4 | 4 | 4 |
| Stearic Acid | 1 | 1 | 1 | 1 | 1 | 1 | 1 | 1 | 1 | 1 |
| CALSOL 810 | 8 | 8 | | 5 | 8 | 8 | | 8 | 8 | |

TABLE 2-continued

|  | 1 | 2 | 3 | 4 | 5 | 6 | 7 | 8 | 9 | 10 |
|---|---|---|---|---|---|---|---|---|---|---|
| STRUKTOL HT 254 Process Aid |  | 7 | 15 | 10 |  | 7 | 15 |  | 7 | 15 |
| Polyfil DL Clay |  |  |  |  | 30 | 30 | 30 |  |  |  |
| WHITING (CaCO3) |  |  |  |  |  |  |  | 30 | 30 | 30 |
| KADOX 911 (Zinc Oxide) | 1 | 1 | 1 | 1 | 1 | 1 | 1 | 1 | 1 | 1 |
| MBTS Accelerator | 1.25 | 1.25 | 1.25 | 1.25 | 1.25 | 1.25 | 1.25 | 1.25 | 1.25 | 1.25 |
| SULFUR | 0.5 | 0.5 | 0.5 | 0.5 | 0.5 | 0.5 | 0.5 | 0.5 | 0.5 | 0.5 |
| Total phr | 182.75 | 182.75 | 182.75 | 182.75 | 212.75 | 212.75 | 212.75 | 212.75 | 212.75 | 212.75 |
| Processing Properties |  |  |  |  |  |  |  |  |  |  |
| Mooney Viscosity ML(1 + 4)@100 C. | 54.3 | 43.9 | 37 | 43 | 54.7 | 41.3 | 42.3 | 56.7 | 44.4 | 45.8 |
| Mooney Scorch @135 C. |  |  |  |  |  |  |  |  |  |  |
| D5 | 12.7 | 15.57 | 24.17 | 22.13 | 11.47 | 16.32 | 16.55 | 11.65 | 15.2 | 18.82 |
| D10 | 14.77 | 19.92 | >30 | 59.95 | 13.88 | 20.98 | 23.67 | 13.73 | 19.02 | >30 |
| Cure Properties MDR@160 C. |  |  |  |  |  |  |  |  |  |  |
| Ml | 1.32 | 1.05 | 1 | 0.99 | 1.32 | 1.15 | 1.01 | 1.44 | 1.12 | 1.26 |
| Mh | 4.53 | 4.89 | 5.02 | 5.09 | 4.45 | 4.17 | 3.72 | 5.14 | 5.39 | 5.32 |
| T2 Scorch | 5.02 | 6.61 | 7.16 | 6.27 | 5.66 | 10.43 | 13.31 | 4.56 | 6.01 | 6.73 |
| T25 | 2.62 | 3.39 | 4.48 | 3.75 | 2.81 | 4.14 | 5.08 | 2.9 | 3.72 | 4.12 |
| T50 | 4.03 | 6.33 | 7.19 | 6.43 | 4.28 | 7.4 | 8.42 | 4.26 | 6.43 | 6.82 |
| T90 | 10.7 | 16.11 | 16.94 | 16.42 | 17.69 | 15.74 | 19.51 | 11.22 | 15.82 | 16.98 |
| Physical Properties CureT90 + 2@160 C. |  |  |  |  |  |  |  |  |  |  |
| Tensile, MPa | 9.56 | 9.79 | 11.32 | 10.45 | 7.94 | 9.19 | 9.18 | 7.63 | 8.8 | 9.1 |
| 100% Modulus, MPa | 0.9 | 0.96 | 1.27 | 1.03 | 1.2 | 1.19 | 1.57 | 0.98 | 1.13 | 1.4 |
| 300% Modulus, MPa | 3.06 | 4.69 | 5.68 | 4.97 | 3.12 | 4.6 | 4.94 | 2.82 | 4.75 | 4.97 |
| Elongation, % | 848 | 561 | 588 | 580 | 764 | 580 | 540 | 725 | 510 | 513 |
| Air Permeability |  |  |  |  |  |  |  |  |  |  |
| MOCON@60 C. | 0.692 | 0.8237 | 0.8077 | 0.7384 | 0.5175 | 0.6487 | 0.687 | 0.6407 | 0.7738 | 0.7115 |
| Relative to #1 | 1.00 | 1.19 | 1.17 | 1.07 | 0.75 | 0.94 | 0.99 | 0.93 | 1.12 | 1.03 |

Similar results are obtained using an Exxpro™ innerliner and a Nanocomposite innerliner formulation, as shown in Table 3. The use of Exxpro™ (Example #5) and a Nanocomposite (Example #9) improve air permeability relative to Bromobutyl Control Compound #1. Air permeability values are equivalent to or lower than respective Control Compounds when using the process aid in place of the 40 MS Resin (Examples #2 and #3, Examples #6 and #7, and Examples #10 and #11), or the 40 MS Resin and part of the Naphthenic process oil (Example #4, Example #8, and Example #12).

TABLE 3

|  | 1 | 2 | 3 | 4 | 5 | 6 | 7 |
|---|---|---|---|---|---|---|---|
| Ingredients |  |  |  |  |  |  |  |
| BROMOBUTYL 2222 | 100 | 100 | 100 | 100 |  |  |  |
| Exxpro MDX03-1 |  |  |  |  | 100 | 100 | 100 |
| NanExx 28 |  |  |  |  |  |  |  |
| N660 | 60 | 60 | 60 | 60 | 60 | 60 | 60 |
| CALSOL 810 | 8 | 8 | 8 | 5 | 8 | 8 | 8 |
| Struktol 40 MS Fla | 7 |  |  |  | 7 |  |  |
| SP-1068 | 4 | 4 | 4 | 4 | 4 | 4 | 4 |
| STEARIC ACl 5016NF | 1 | 1 | 2 | 2 | 1 | 1 | 2 |
| STRUKTOL HT 254 |  | 7 | 7 | 10 |  | 7 | 7 |
| KADOX 911 | 1 | 1 | 1 | 1 | 1 | 1 | 1 |
| ALTAX, MBTS | 1.25 | 1.25 | 1.25 | 1.25 | 1.25 | 1.25 | 1.25 |
| SULFUR | 0.5 | 0.5 | 0.5 | 0.5 | 0.5 | 0.5 | 0.5 |
| Total phr lab | 182.75 | 182.75 | 183.75 | 183.75 | 182.75 | 182.75 | 183.75 |
| Processing Properties MS@135 C. |  |  |  |  |  |  |  |
| d5 | 12.3 | 14 | 15.93 | 20.12 | 13.53 | 14.97 | 14.02 |
| d10 | 14.62 | 19.07 | 21.08 | 22.11 | 16.05 | 20.87 | 20.95 |
| Cure Properties MDR@160 C. M |  |  |  |  |  |  |  |
| Mh | 4.86 | 5.56 | 4.74 | 5.04 | 6.18 | 5.05 | 4.52 |
| T2 | 4.71 | 6.84 | 8.01 | 8.46 | 3.86 | 9.86 | 12.15 |

TABLE 3-continued

|  | | | | | | | |
|---|---|---|---|---|---|---|---|
| T50 | 3.74 | 6.86 | 6.84 | 7.46 | 4.2 | 9 | 9.06 |
| T90 | 13.06 | 14.92 | 15.61 | 18.35 | 6.74 | 22.74 | 23.73 |
| Physical Properties CureTc90 + 2@160 C. Shore A | | | | | | | |
| Tensile, MPa | 8.442 | 9.302 | 8.765 | 10.431 | 7.942 | 8.683 | 8.306 |
| 100% Modulus, MPa | 0.994 | 1.124 | 0.989 | 1.144 | 2.732 | 1.24 | 1.188 |
| 300% Modulus, MPa | 3.259 | 5.147 | 4.489 | 5.388 | 5.317 | 4.701 | 4.335 |
| % Elongation | 736 | 526 | 534 | 545 | 630 | 581 | 582 |
| Air Permeability | | | | | | | |
| MOCON@60 C. | 0.6596 | 0.7565 | 0.7829 | 0.8515 | 0.623 | 0.6596 | 0.603 |
| Relative Mocon | 1.00 | 1.15 | 1.19 | 1.29 | 0.94 | 1.00 | 0.91 |
|  |  |  |  |  | 1.00 | 1.06 | 0.97 |

|  | 8 | 9 | 10 | 11 | 12 |
|---|---|---|---|---|---|
| Ingredients | | | | | |
| BROMOBUTYL 2222 | | | | | |
| Exxpro MDX03-1 | 100 | | | | |
| NanExx 28 | | 100 | 100 | 100 | 100 |
| N660 | 60 | 60 | 6 | 60 | 60 |
| CALSOL 810 | 5 | 8 | 3.5 | 3.5 | 3.5 |
| Struktol 40 MS Fla | | 7 | 7 | | |
| SP-1068 | 4 | 4 | 4 | 4 | 4 |
| STEARIC ACl 5016NF | 2 | 1 | 1 | 1 | 2 |
| STRUKTOL HT 254 | 10 | | | 7 | 7 |
| KADOX 911 | 1 | 1 | 1 | 1 | 1 |
| ALTAX, MBTS | 1.25 | 1.25 | 1.25 | 1.25 | 1.25 |
| SULFUR | 0.5 | 0.5 | 0.5 | 0.5 | 0.5 |
| Total phr lab | 186.75 | 182.75 | 124.25 | 178.25 | 179.25 |
| Processing Properties MS@135 C. | | | | | |
| d5 | 16.87 | 6.07 | 7.78 | 52.2 nc | |
| d10 | 25.43 | 7.52 | 9.72 | 54.33 nc | |
| Cure Properties MDR@160 C. M | | | | | |
| Mh | 4.35 | 5.08 | 2.28 | 3.54 | 3.31 |
| T2 | 15.29 | 10.5 | | | |
| T50 | 9.76 | 9.5 | 10.78 | 6.87 | 9.83 |
| T90 | 28.64 | 17.72 | 18.3 | 20.81 | 39.72 |
| Physical Properties CureTc90 + 2@160 C. Shore A | | | | | |
| Tensile, MPa | 8.387 | 7.828 | 8.015 | 6.444 | 6.137 |
| 100% Modulus, MPa | 1.203 | 1.802 | 1.746 | 1.165 | 1.3 |
| 300% Modulus, MPa | 4.125 | 4.047 | 3.9 | 2.605 | 3.01 |
| % Elongation | 622 | 825 | 861 | 804 | 815 |
| Air Permeability | | | | | |
| MOCON@60 C. | 0.6085 | 0.5582 | 0.4996 | 0.5289 | |
| Relative Mocon | 0.92 | 0.85 | 0.76 | 0.80 | |
|  | 0.98 | 0.90 | 0.90 | 0.85 | |
|  |  |  | 1.00 | 0.90 | 0.95 |

Figure 1:
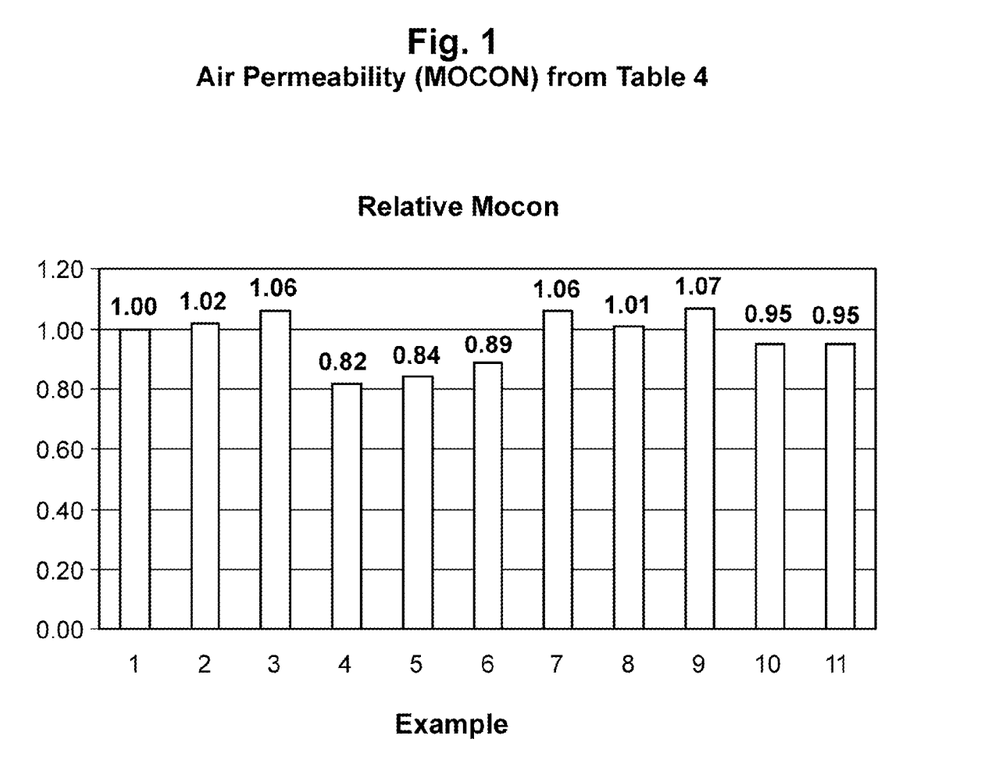
FIG. 1 sets forth air permeability data for compositions as according to the invention and comparative compositions.

When the processing aid is used in low levels in addition to the current 40 MS Resin and Naphthenic process oil materials, 16 to 18% reductions in air permeability can be obtained. See Examples #4-#5 in Table 4 and FIG. 1. Cure, processing and physical properties are desirably unchanged from Control Compound #1.

TABLE 4

|  | 1 | 2 | 3 | 4 | 5 | 6 | 7 | 8 | 9 | 10 | 11 |
|---|---|---|---|---|---|---|---|---|---|---|---|
| Ingredient | | | | | | | | | | | |
| BROMOBUTYL 2222 | 100 | 100 | 100 | 100 | 100 | 100 | 100 | 100 | 100 | 100 | 100 |
| N660 Black | 60 | 60 | 60 | 60 | 60 | 60 | 60 | 60 | 60 | 60 | 60 |
| CALSOL 810 | 8 | 8 | 8 | 8 | 8 | 8 | 8 | 8 | 8 | 8 | 8 |
| Struktol 40 MS Fla | 7 | 7 | 7 | 7 | 7 | 7 | 6 | 6 | 5 | 4 | 3 |

TABLE 4-continued

|  | 1 | 2 | 3 | 4 | 5 | 6 | 7 | 8 | 9 | 10 | 11 |
|---|---|---|---|---|---|---|---|---|---|---|---|
| STRUKTOL HT 254 | 0 | 0.5 | 1 | 1.5 | 2 | 4 | 0.5 | 1 | 2 | 3 | 4 |
| SP-1068 Resin | 4 | 4 | 4 | 4 | 4 | 4 | 4 | 4 | 4 | 4 | 4 |
| STEARIC ACl 5016NF | 1 | 1 | 1 | 1 | 1 | 1 | 1 | 1 | 1 | 1 | 1 |
| KADOX 911 | 1 | 1 | 1 | 1 | 1 | 1 | 1 | 1 | 1 | 1 | 1 |
| MBTS Accelerator | 1.25 | 1.25 | 1.25 | 1.25 | 1.25 | 1.25 | 1.25 | 1.25 | 1.25 | 1.25 | 1.25 |
| SULFUR | 0.5 | 0.5 | 0.5 | 0.5 | 0.5 | 0.5 | 0.5 | 0.5 | 0.5 | 0.5 | 0.5 |
| Total phr | 182.75 | 183.25 | 183.75 | 184.25 | 184.75 | 186.75 | 182.25 | 182.75 | 182.75 | 182.75 | 182.75 |
| Processing Properties |  |  |  |  |  |  |  |  |  |  |  |
| MV 1 + 4@100 C. | 55.4 | 54.9 | 54 | 54.6 | 55.1 | 48.9 | 55.6 | 56.5 | 53 | 51.6 | 51.3 |
| MS@135 C. |  |  |  |  |  |  |  |  |  |  |  |
| D5 | 12.48 | 12.35 | 13.45 | 14.12 | 14.35 | 14.57 | 12.93 | 12.97 | 14.47 | 15.57 | 15.67 |
| D10 | 14.2 | 14.27 | 15.63 | 16.53 | 17.07 | 17.05 | 14.95 | 15.08 | 17.2 | 18.78 | 19 |
| Cure Properties MDR@160 C., .5Arc |  |  |  |  |  |  |  |  |  |  |  |
| Ml | 1.31 | 1.29 | 1.27 | 1.3 | 1.32 | 1.13 | 1.35 | 1.37 | 1.22 | 1.17 | 1.26 |
| Mh | 4.53 | 4.41 | 4.42 | 4.71 | 4.62 | 4.38 | 4.64 | 4.71 | 4.73 | 4.71 | 4.93 |
| T2 | 4.46 | 4.93 | 5.41 | 5.42 | 6.21 | 7.6 | 4.72 | 5.03 | 5.64 | 6.42 | 6.56 |
| T50 | 3.63 | 3.87 | 4.3 | 4.66 | 5.1 | 6.01 | 3.94 | 4.22 | 4.98 | 5.59 | 6 |
| T90 | 9.77 | 9.82 | 9.81 | 10.25 | 11.1 | 13.75 | 9.38 | 9.72 | 10.95 | 13.16 | 13.76 |
| Physical Properties Cure T90 + 2@160 C. |  |  |  |  |  |  |  |  |  |  |  |
| Tensile MPa | 9.014 | 9.055 | 9.262 | 9.292 | 9.33 | 8.38 | 8.442 | 8.767 | 9.448 | 8.85 | 9.296 |
| 100% Modulus MPa | 0.901 | 0.918 | 0.929 | 0.933 | 0.928 | 0.837 | 0.904 | 0.923 | 0.928 | 0.908 | 1.036 |
| 300% Modulus MPa | 2.902 | 2.902 | 3.066 | 2.951 | 3.005 | 2.601 | 2.914 | 2.908 | 3.18 | 3.239 | 4.059 |
| % Elongation | 807 | 826 | 821 | 846 | 825 | 820 | 761 | 791 | 798 | 751 | 767 |
| Air Permeability |  |  |  |  |  |  |  |  |  |  |  |
| MOCON @60 C. | 0.741 | 0.7567 | 0.7886 | 0.6107 | 0.6247 | 0.6608 | 0.7856 | 0.7462 | 0.7915 | 0.7029 | 0.7067 |
| Relative Mocon | 1.00 | 1.02 | 1.06 | 0.82 | 0.84 | 0.89 | 1.06 | 1.01 | 1.07 | 0.95 | 0.95 |

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The invention has been described above with reference to numerous embodiments and specific examples. Many variations will suggest themselves to those skilled in this art in light of the above detailed description. All such obvious variations are within the full intended scope of the appended claims.

What is claimed is:

1. A green (uncured) composition suitable for a tire innerliner comprising a halobutyl elastomer, filler selected from at least one of carbon black and clay, a curative, at least one processing aid selected from resins, plastomers, polybutenes, and polyalphaolefin oils in the amount of 5 to 20 phr, at least one processing oil selected from naphthenic oil, paraffinic oil, aromatic oil, MES (mild extraction solvate), and TDAE (treated distillate aromatic extract), and at least one processing aid selected from fatty acid metal salts in the amount of 1 to 5 phr.

2. The green (uncured) composition according to claim 1, wherein said elastomer is selected from brominated isobutylene-isoprene rubber, chlorinated isobutylene-isoprene rubber, star-branched brominated butyl (SBB), brominated isobutylene-co-p-methyl-styrene copolymer, and mixtures thereof.

3. A cured and optionally crosslinked composition made by curing the composition according to claim 1.

4. A cured and optionally crosslinked composition made by curing the composition according to claim 2.

5. A tire innerliner comprising the composition of claim 3.

6. A tire innerliner comprising the composition of claim 4.

7. The composition of claim 1, also comprising a secondary elastomer selected from natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; isobutylene/alkylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof 8. The composition of claim 1, wherein the compound comprising a single fatty acid component.

* * * * *